(12) United States Patent
Song et al.

(10) Patent No.: US 9,743,037 B2
(45) Date of Patent: Aug. 22, 2017

(54) METHOD FOR TRANSMITTING DEVICE INDICATOR DATA IN NETWORK-BASED AV SYSTEM

(71) Applicant: Korea Electronics Technology Institute, Seongnam-si, Gyeonggi-do (KR)

(72) Inventors: Byoung Chul Song, Seoul (KR); Ki Won Kwon, Seongnam-si (KR); Jung Wook Wee, Seoul (KR); Kyung Won Park, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 14/956,479

(22) Filed: Dec. 2, 2015

(65) Prior Publication Data
US 2016/0227159 A1   Aug. 4, 2016

(30) Foreign Application Priority Data
Jan. 30, 2015   (KR) .................. 10-2015-0014749

(51) Int. Cl.
| | |
|---|---|
| H04N 7/08 | (2006.01) |
| H04N 17/00 | (2006.01) |
| H04N 21/65 | (2011.01) |
| H04L 12/24 | (2006.01) |
| H04N 21/439 | (2011.01) |
| H04N 21/658 | (2011.01) |
| H04L 12/26 | (2006.01) |

(52) U.S. Cl.
CPC .............. *H04N 7/08* (2013.01); *H04L 41/00* (2013.01); *H04L 43/00* (2013.01); *H04N 17/00* (2013.01); *H04N 21/4394* (2013.01); *H04N 21/65* (2013.01); *H04N 21/658* (2013.01); *H04N 2017/006* (2013.01)

(58) Field of Classification Search
CPC ........................................................ H04N 7/08
USPC ........................................................ 348/184
See application file for complete search history.

(56) References Cited

U.S. PATENT DOCUMENTS

| | | | | |
|---|---|---|---|---|
| 2006/0034326 | A1* | 2/2006 | Anderson | H04L 69/18 370/466 |
| 2013/0003757 | A1* | 1/2013 | Boatright | H04J 3/0697 370/474 |
| 2014/0244807 | A1* | 8/2014 | Togashi | H04L 12/2834 709/219 |

FOREIGN PATENT DOCUMENTS

| | | |
|---|---|---|
| KR | 1020050019542 A | 3/2005 |
| KR | 1020100135157 A | 12/2010 |
| KR | 1020120101061 A | 9/2012 |

OTHER PUBLICATIONS

Korean Intellectual Property Office, Communication dated Nov. 30, 2015, issued in corresponding Korean Application No. 10-2015-0014749.

* cited by examiner

*Primary Examiner* — Brian Yenke
*Assistant Examiner* — Justin Sanders
(74) *Attorney, Agent, or Firm* — Sughrue Mion, PLLC

(57) ABSTRACT

A method for transmitting device indicator data in a network-based AV system is provided. The method for transmitting the device indicator data records device indicator data on a data unit which is used in an AV transmission protocol, and transmits the data unit. Accordingly, the indicator data which changes in real time in a network AV device can be rapidly transmitted to a management platform.

3 Claims, 8 Drawing Sheets

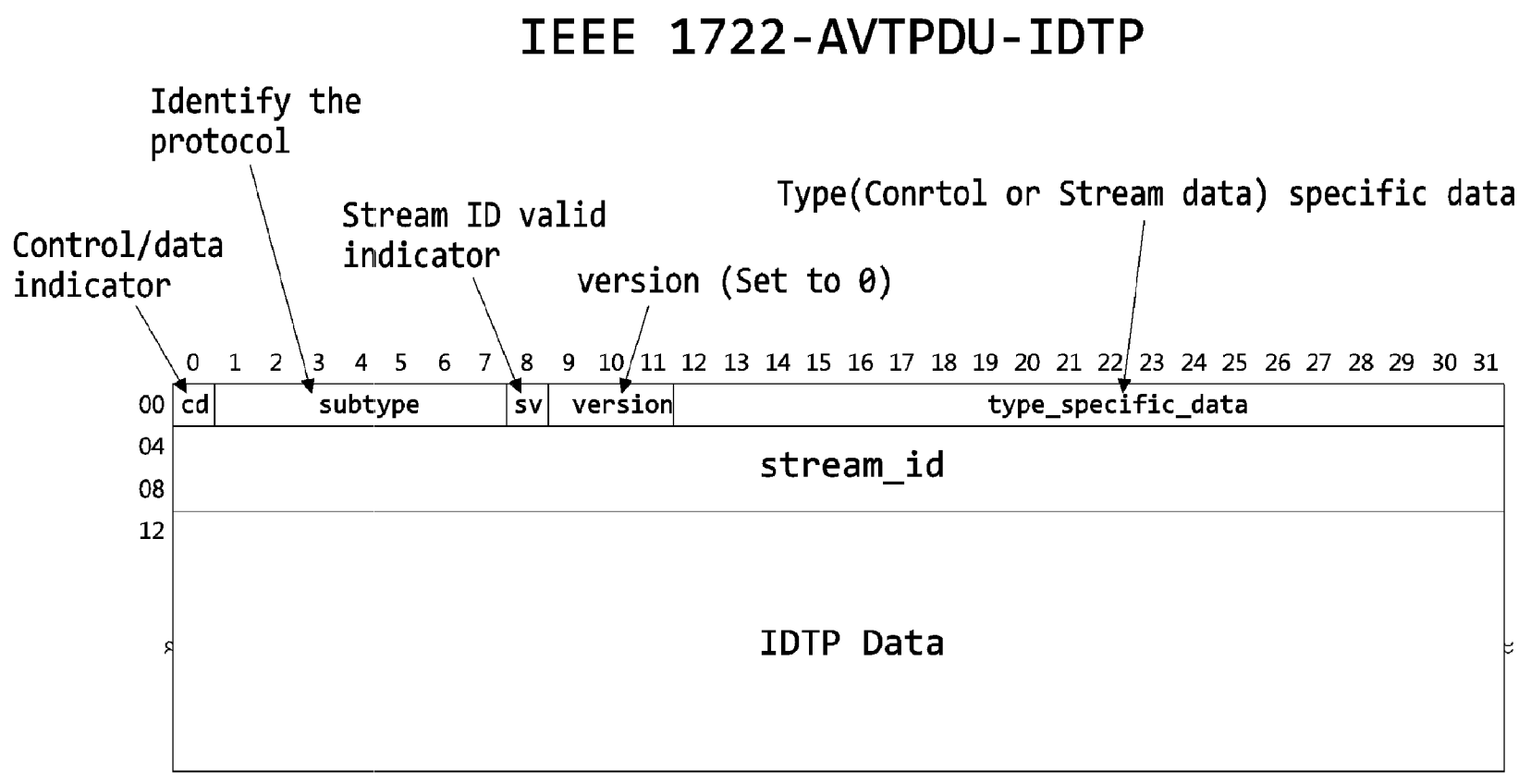

IEEE 1722-AVTPDU-IDTP

|     | 0 1 2 3 | 4 5 6 7 | 8 | 9 10 11 | 12 13 14 15 16 17 18 19 20 21 22 | 23 24 25 26 27 28 29 30 31 |
|-----|---------|---------|-----|---------|----------------------------------|----------------------------|
| 00  | cd      | subtype | sv  | version | type_specific_data               |                            |
| 04  | stream_id |       |     |         |                                  |                            |
| 08  |         |         |     |         |                                  |                            |
| 12  | IDTP Data |       |     |         |                                  |                            |

- Control/data indicator → cd (Identify the protocol)
- subtype
- sv (Stream ID valid indicator)
- version (Set to 0)
- type_specific_data — Type (Control or Stream data) specific data

FIG. 4

|  | 1Byte | 1Byte | 1Byte | 1Byte | 1Byte |
|---|---|---|---|---|---|
| (A) | Protocol | Message | Value#1 | Length | Data |

| (B) | 222 | CONNECT | 10 | 0 |
|---|---|---|---|---|

00010001
ACK#11101110

| (C) | 222 | REGIST | Indicator ID | 24 | Indicator Name |
|---|---|---|---|---|---|

01010101
REGI ACK #10101010

IDTP Packet Structure

FIG. 6

IDTP Data Frame Structure

METHOD FOR TRANSMITTING DEVICE INDICATOR DATA IN NETWORK-BASED AV SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Jan. 30, 2015, and assigned Serial No. 10-2015-0014749, the entire disclosure of which is hereby incorporated by reference.

TECHNICAL FIELD OF THE INVENTION

The present invention relates generally to an audio and video device system, and more particularly, to a method for transmitting information displaying state/operation of devices to a remote management control platform in a network-based audio and video device system.

BACKGROUND OF THE INVENTION

In most of the related-art network-based audio and video device systems, indicator data which is fragmentary and is little changed with time, such as information on whether the system operates or not, information on a currently serviced content, or the like, is merely transmitted to a management program.

In the case of the output of a level meter which changes in real time or output values for each channel or each frequency as shown in FIGS. 1 and 2, much data is dynamically changed with time and thus it is difficult for the system to transmit such data.

Device indicator data which changes in real time and changes much may interrupt transmission of audio and video data which are primarily transmitted via a network, and may cause a network load to increase.

Therefore, there is a demand for a method for transmitting device indicator data without causing a problem in a network.

SUMMARY OF THE INVENTION

To address the above-discussed deficiencies of the prior art, it is a primary aspect of the present invention to provide a method for transmitting device indicator data in a network-based AV system by dramatically reducing an amount of indicator data to be transmitted and a transmission period.

According to one aspect of the present invention, a method for transmitting device indicator data includes: recording device indicator data on a data unit which is used in an AV transmission protocol; and transmitting the data unit.

The device indicator data may include at least one of data indicating indicator measurement quality and data indicating an indicator transmission period.

The indicator measurement quality may be a number of times an indicator is measured per unit time, and may be limited to lower than a maximum number of times.

The indicator transmission period may be equal to basic period×P, and the data indicating the indicator transmission period may be P.

The device indicator may include a plurality of sub indicators, and the device indicator data may include data indicating a number of sub indicators.

The device indicator data may include data indicating an output indicator of the device.

The device may be an AV device, and the transmitting may include transmitting the data unit to a device which monitors the AV device, and the device indicator data may be audio output level meter data.

According to another aspect of the present invention, a device includes: a processor configured to record device indicator data on a data unit which is used in an AV transmission protocol; and a communication unit configured to transmit the data unit.

According to exemplary embodiments of the present invention described above, the network AV device embodies a new protocol, an Indicator Data Train Protocol (IDTP), in the IEEE1722 protocol for transmitting audio and video data, in order to transmit indicator data changing in real time, and thus can rapidly transmit the data to a platform which manages a level meter for each audio channel and an output current measurement value of audio.

There has been no effective method for transmitting a large amount of indicator data, which changes in real time, using the IEEE1722 protocol, but exemplary embodiments of the present invention provide a method for solving this problem.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a view showing an example of a packet structure which is used in an Indicator Data Train Protocol (IDTP);

FIG. 6 is a view showing an example of a structure of an IDTP packet which is used in connection/registration processes;

DETAILED DESCRIPTION OF THE INVENTION

Figure 1:
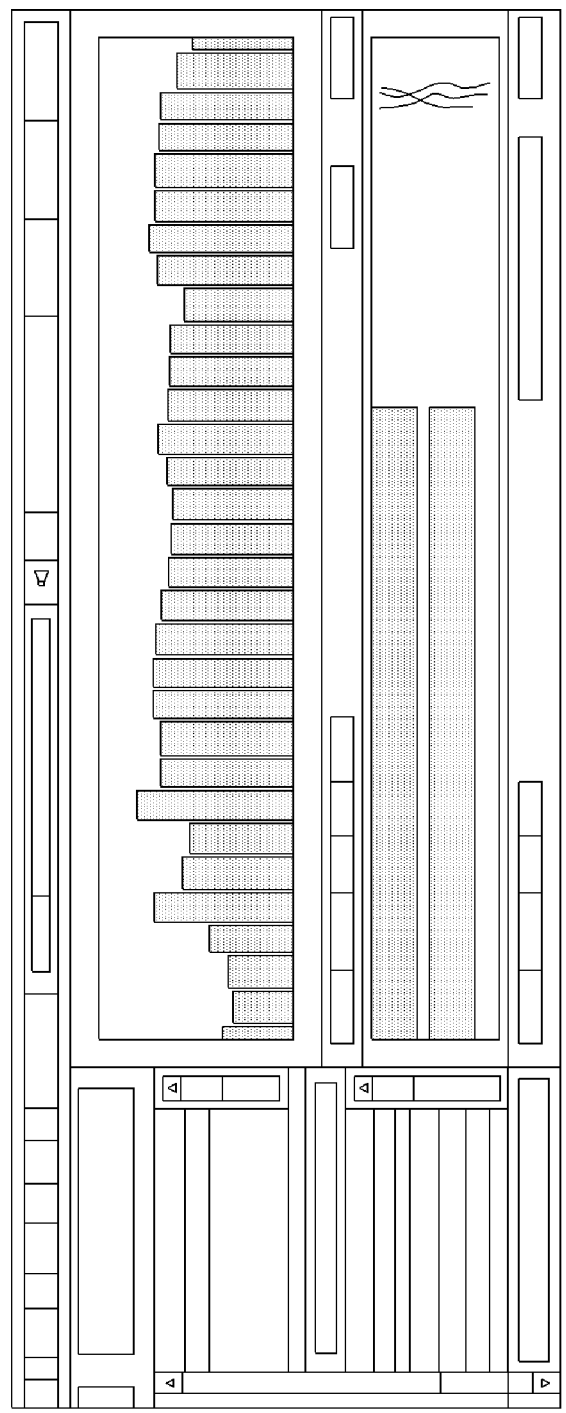
FIGS. 1 and 2 are views showing an example of a level meter the output of which changes in real time.
Figure 2:
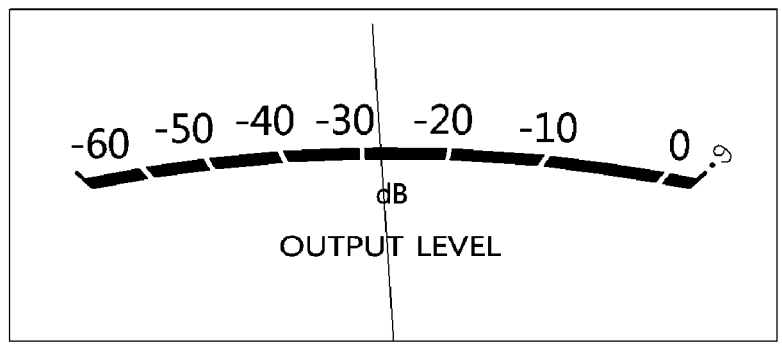

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

Figure 3:
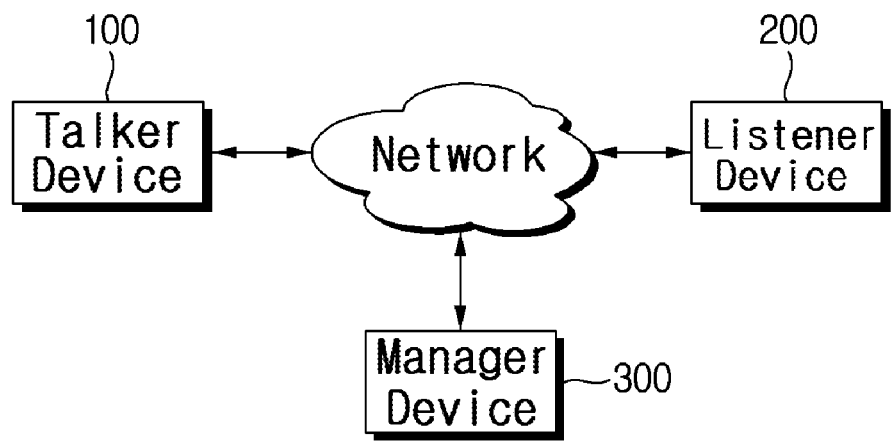
FIG. 3 is a view showing an example of a network-based AV system to which the present invention is applicable.

FIG. 3 is a view showing an example of a network-based AV system to which the present invention is applicable. As shown in FIG. 3, the AV system to which the present invention is applicable is established by connecting a talker device 100, a listener device 200, and a manager device 300 with one another via a network to be able to communicate with one another.

The talker device 100 is a transmission end for transmitting AV streams to the listener device 200 via the network, and the listener device 200 is a reception end for receiving the AV streams from the talker device 100 via the network and outputting the AV streams.

The manager device 300 is a device for remotely monitoring and managing a sound output indicator of the listener device 200.

The listener device 200 periodically transmits its own sound output indicator data to the manager device 300 to be monitored by the manager device 300.

According to an exemplary embodiment of the present invention, an IDTP is provided in order for the listener device 200 to transmit its own indicator data to the manager device 300 based on an IEEE1722 protocol for transmitting AV data.

The IDTP suggests a packet structure for transmitting indicator data using an IEEE1722-AVTPDU (Audio Video Transport Protocol Data Unit), and this packet structure is illustrated in FIG. 4.

To transmit the indicator data using the IDTP, cd, which is the most significant bit in the IEEE1722-AVTPDU, is designated as an indicator, and a subtype field records a code instructing the IDTP. In addition, in the basic format of the IEEE1722-AVTPDU, IDTP data is recorded after stream_id.

The structure of the IDTP data will be explained in detail below with reference to FIGS. 6 and 7.

Figure 5:
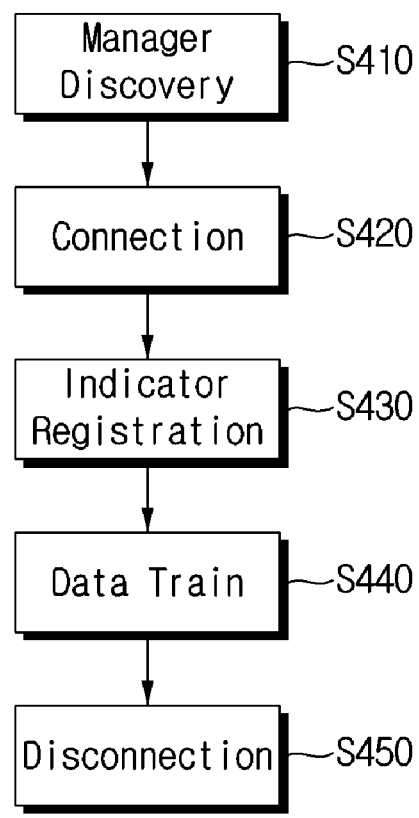
FIG. 5 is a flowchart to illustrate a method for transmitting an Indicator Data Train (IDT) according to an exemplary embodiment of the present invention.

Hereinafter, the IDTP will be explained in detail with reference to FIG. 5. FIG. 5 is a flowchart to illustrate a method for transmitting an Indicator Data Train (IDT) according to an exemplary embodiment of the present invention.

As shown in FIG. 5, the listener device 200 discovers the manager device 300, which is a destination target to transmit indicator data of its own operation, on the network (S410).

In step S410, the listener device 200 may refer to its internal information first. This is because the listener device 200 may already know the address of the manager device 300.

When the listener device 200 does not contain the address information therein, the listener device 200 discovers the manager device 300 using IEEE1722.1 data which is periodically transmitted by a monitoring manager platform of the manager device 300.

When the IEEE1722.1 data is not received until the discovering operation times out, there may not be the manager device 300, that is, there may not be any target to transmit the indicator data. This is because the monitoring manager platform of the manager device 300 periodically transmits the IEEE1722.1 data.

When the manager device 300 is discovered, the listener device 200 starts a connection process to connect with the manager device 300 (S420).

In step S420, a connection procedure is performed through a CONNECT message by writing the address of the manager device 300 on an Ethernet address, and the result of the connection is notified through an ACK message.

After being connected to the manager device 300 to transmit the indicator data based on the IDTP, the listener device 200 registers an item regarding the indicator data to transmit to the manager device 300 (S430).

When the registration is completed, an Indicator ID (IID) is issued/assigned to the listener device 200 by the manager device 300.

Next, the listener device 200 which is issued/assigned the IID periodically transmits the IDT to the manager device 300 (S440), and, when the indicator data does not need to be transmitted anymore, the listener device 200 may perform a disconnection process to disconnect from the manager device 300 (S450).

FIG. 6 is a view showing an example of a structure of an IDTP packet which is used in the connection process of step S420 and the registration process of step S430. As shown in FIG. 6, data indicating a procedure to be performed is recorded on the message of the IDTP packet. In addition, in the registration process, the IID and an indicator name are recorded on the IDTP packet.

Figure 7:
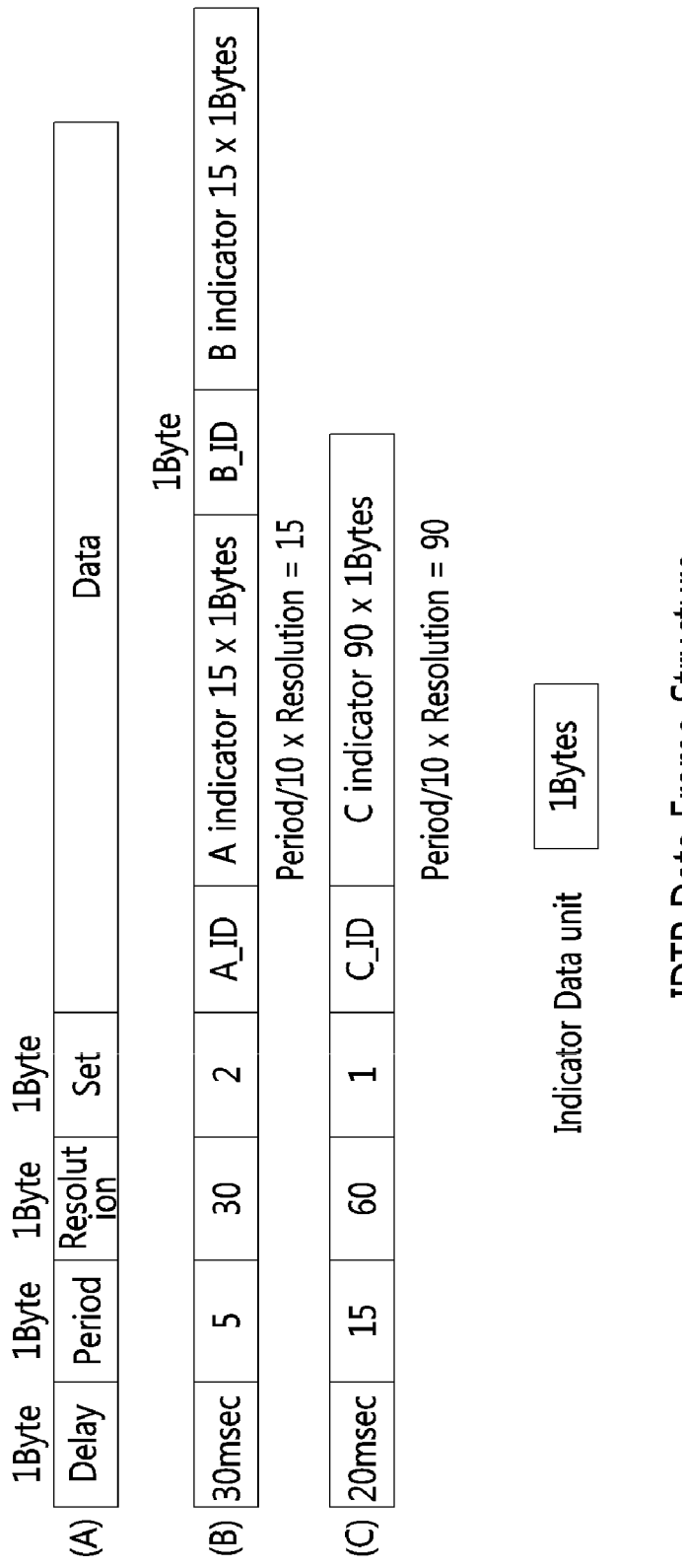
FIG. 7 is a view showing an example of a frame structure of IDTP data which is used in an indicator data transmission process.

FIG. 7 is a view showing an example of a frame structure of IDTP data which is used in the indicator data transmission process of step S440. As shown in FIG. 7, the IDTP data includes "Delay," "Period," "Resolution," "Set," and "Data."

The "Resolution" is a concept of a frequency indicating how many times a second the indicator data is measured or extracted, and has a maximum value of 100 (a value range is 10-100, measured in the unit of tens). A single piece of indicator data corresponds to 1 byte.

The "Resolution" is data indicating indicator measurement quality and indicates the number of times the indicator data is measured per unit time.

The "Delay" is information indicating an initial delay, and indicates not only real-time transmission, but also maximum 2-second delay transmission in the unit of $\frac{1}{100}$ second (0-200).

The "Period" indicates a period of transmitting IDTP data and is expressed in the unit of $\frac{1}{10}$ second. Therefore, when "Period" is 3, the IDTP data is transmitted every $\frac{3}{10}$ second, and, when "Period" is 20, the IDTP data is transmitted every $\frac{20}{10}$ second. The range of "Period" is 1-20 and the "Period" may be operated to transmit data every 2 seconds to the maximum.

The maximum value of the "Resolution" is 100 (that is, the indicator data is measured 100 times a second). However, when the data is transmitted in the unit of $\frac{1}{100}$ second, for example, the data may place a burden on the listener device 200 and the manager device 300. Therefore, as an option for transmitting the indicator data safely while avoiding frequent transmission, the "Period" may be set to the unit of $\frac{1}{10}$ second. However, this is merely an example and can be changed.

In the case of (C) of FIG. 7, the indicator data which is measured 60 times a second is transmitted every 15/10 second. As a result, 90 pieces of indicator data are collected and transmitted simultaneously.

The device indicator data may include a plurality of pieces of sub indicator data. For example, an audio output level may include an L-audio output level and an R-audio output level.

In this case, as shown in view (B) of FIG. 7, the sub indicator data is classified by an IID and recorded on the "Data" separately, and the number of sub indicator data, "2", is recorded on the "Set."

Figure 8:
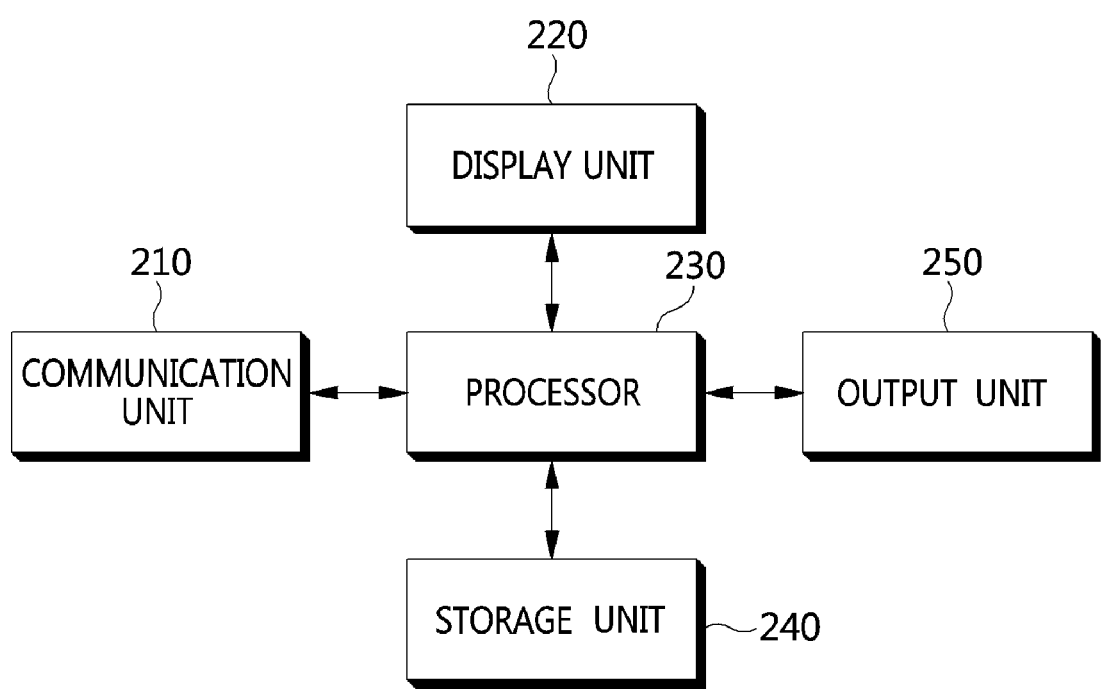
FIG. 8 is a block diagram showing a listener device in detail.

FIG. 8 is a block diagram showing the listener device 200 in detail. As shown in FIG. 8, the listener device 200 includes a communication unit 210, a display unit 220, a processor 230, a storage unit 240, and an output unit 250.

The communication unit 210 is a communication interface means for establishing and maintaining communication connection with the talker device 100 and the manager device 300.

The display unit 220 and the output unit 250 are means for outputting AV data received from the talker device 100 through the communication unit 210.

The processor 230 performs a procedure necessary for receiving the AV data and performs procedures necessary for the IDT transmission process shown in FIG. 5.

The method for transmitting the device indicator data in the network-based AV system according to exemplary embodiments has been described up to now.

In the above-described exemplary embodiments, the sound output indicator of the listener device 200 is merely an example of the device indicator data. The technical idea of the present invention can be applied when the sound output indicator of the listener device 200 is changed to the output indicators of other kinds of devices.

In addition, in the above-described exemplary embodiments, the network-based AV system has been described, but this is merely an example for convenience of explanation. The technical idea of the present invention can be applied to other systems in addition the network-based AV system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a first device to transmit indicator data to a second device, the method comprising:
    recording indicator data on a data unit which is used for audio/video (AV) data in an AV transmission protocol;
    if a network address of the second device is stored in the first device, transmitting the data unit using the stored network address;
    if the network address of the second device is not stored in the first device, determining whether predetermined data that is periodically transmitted by the second device is received before a predetermined time elapses;
    if the predetermined data is received before the predetermined time elapses, obtaining the network address of the second device from the predetermined data and transmitting the data unit to the second device using the obtained network address; and
    if the predetermined data is not received before the predetermined time elapses, discarding the data unit without sending to the second device,
    wherein the indicator data indicates a status of the first device processing AV data received from a third device according to the AV transmission protocol,
    wherein the indicator data comprises data indicating a number of sub indicators, data indicating indicator measurement quality and data indicating an indicator transmission period,
    wherein the indicator measurement quality is a number of times an audio output level meter is measured per unit time, and is limited to numbers lower than a predetermined maximum number,
    wherein the data indicating the indicator transmission period represents number P, the indicator transmission period being equal to basic period×P,
    wherein the indicator data is audio output level meter data, and
    wherein the indictor data is disposed after a stream identification (ID) in the data unit.

2. The method of claim 1, wherein the indicator data comprises data indicating an output indicator of the first device.

3. A first device which transmits indicator data to a second device, the first device comprising:
    a processor configured to record indicator data on a data unit which is used for audio/video (AV) data in an AV transmission protocol; and
    a communication unit configured to transmit the data unit to the second device,
    wherein the processor is further configured to:
        if a network address of the second device is stored in the first device, control the communication unit to transmit the data unit using the stored network address;
        if the network address of the second device is not stored in the first device, determine whether predetermined data that is periodically transmitted by the second device is received before a predetermined time elapses;
        if the predetermined data is received before the predetermined time elapses, obtain the network address of the second device from the predetermined data and control the communication unit to transmit the data unit to the second device using the obtained network address; and
        if the predetermined data is not received before the predetermined time elapses, discard the data unit without sending to the second device,
    wherein the indicator data indicates a status of the first device processing AV data received from a third device according to the AV transmission protocol,
    wherein the indicator data comprises data indicating a number of sub indicators, data indicating indicator measurement quality and data indicating an indicator transmission period,
    wherein the indicator measurement quality is a number of times an audio output level meter is measured per unit time, and is limited to numbers lower than a predetermined maximum number,
    wherein the data indicating the indicator transmission period represents number P, the indicator transmission period being equal to basic period×P,
    wherein the indicator data is audio output level meter data, and
    wherein the indictor data is disposed after a stream identification (ID) in the data unit.

* * * * *